United States Patent [19]

Ernst et al.

[11] 4,059,179
[45] Nov. 22, 1977

[54] SELF-CENTERING CLUTCH BEARING

[75] Inventors: Horst Manfred Ernst, Eltinghausen; Armin Olschewski, Schweinfurt; Rainer Schürger, Schwanfeld; Lothar Walter, Schweinfurt; Manfred Brandenstein, Aschfeld; Erich Burkl, Stammheim, all of Germany

[73] Assignee: SKF Industrial Trading and Development Company B.V., Nieuwegein, Netherlands

[21] Appl. No.: 626,647

[22] Filed: Oct. 29, 1975

[30] Foreign Application Priority Data

Dec. 6, 1974 Germany .................... 2457682

[51] Int. Cl.² ............................................. F16D 23/14
[52] U.S. Cl. .................................... 192/98; 308/233
[58] Field of Search .................... 192/98, 110 B; 308/184 A, 184 R, 233, 236; 64/27 B, 27 S

[56] References Cited

U.S. PATENT DOCUMENTS

| 3,277,988 | 10/1966 | Pitner | 192/98 |
| 3,815,715 | 6/1974 | Maucher | 192/98 |
| 3,877,557 | 4/1975 | Maucher | 192/98 |
| 3,904,008 | 9/1975 | Sonnerat | 192/98 |
| 3,913,714 | 10/1975 | Camp | 192/98 |

FOREIGN PATENT DOCUMENTS 2,339,251  2/1974  Germany .................... 192/98

*Primary Examiner*—Benjamin W. Wyche
*Attorney, Agent, or Firm*—Daniel M. Rosen

[57] ABSTRACT

A clutch bearing assembly has inner and outer rings defining a race for ball bearings. The outer ring is adapted to engage a clutch lever, and the inner ring is adapted to be a stationary ring. A sliding sleeve for the assembly is coupled to the inner ring by deformable elements positively affixed to one of these members. The deformable elements may be wire bights having their ends axially inserted in grooves in the inner ring and sliding sleeve. Alternatively, the deformable element may be a spiral spring radially engaging an axial extension of the inner ring and having ends inserted in axially extending holes in the sliding sleeve.

7 Claims, 4 Drawing Figures

SELF-CENTERING CLUTCH BEARING

THE INVENTION

This invention relates to clutch bearing assemblies, and more in particular to clutch bearing assemblies of the type having a pair of co-axial rings defining a race for rolling elements therein, and a sliding sleeve coupled to one of the rings. In this arrangement, the bearing ring coupled to the sliding sleeve constitutes the non-rotating ring of the bearing assembly, and the other bearing ring is adapted to engage a clutch lever.

Clutch shifting or disengaging apparatus of this type is disclosed, for example, in German published patent application No. 2,156,161. In the arrangement of this reference, the stationary bearing ring of the bearing is prevented from twisting in a positive manner. The rotating bearing ring serves to act on the clutch shifting means, and the stationary bearing ring can be acted upon by clutch operating means. The bearing is arranged on the axle of the clutch opposite a holding means, to provide limited movement for self-centering. The locking device of the arrangement projects into a slit of the bearing, so that the bearing can center itself with respect to the axis of the clutch. A Belleville spring provides a resistance opposing movement of the bearing, and this resistance, following the centering of the bearing on the axis of the clutch, insures that the bearing remains in the centered position.

It is the object of the present invention to provide a clutch bearing of the above type wherein, in the event of axle misalignment, self-centering of the roller bearing is permitted so that the bearing stays in its centered position. In addition, it is a further object of the present invention to provide a clutch bearing that consists of a minimum number of structural parts, and that is easily manufactured and assembled. Still further, the invention is directed to the provision of such a bearing which can accommodate larger radial movements of the roller bearing.

Briefly stated, in accordance with the invention, the above objects are achieved by providing a bearing assembly having at least one deformable member, hereafter referred to as a deformable holding means. The deformable holding means is preferably positively affixed to either or both of the stationary bearing ring and the sliding sleeve or the like. The deformable holding means, due to its deformability, enables displacement of the roller bearing in all radial directions, while preventing the rotation of the stationary ring.

In accordance with one embodiment of the invention, the deformable holding means may be comprised of a plurality of deformable links, such as bights or the like, suitably distributed at the periphery of the assembly. One end of each of the links or bights is positively affixed to the stationary bearing ring, and the other end thereof is positively affixed to the sliding sleeve. For example, in a preferred embodiment of the invention, the ends of the links or bights are arranged so that they may be simultaneously pressed in grooves in the stationary bearing ring and the slidable sleeve, by the application of axially directed force.

In a further embodiment of the invention, the deformable holding means may be in the shape of a coil having its two ends positively affixed to one of the members of the clutch bearing, for example, the sliding sleeve. The other member of the clutch bearing, for example, a stationary bearing ring, may have recesses such as spiral grooves and slits, adapted to mesh with the long portion of the coil spring.

In order to insure the flexible radial self-centering displacement of the roller bearing, in accordance with the invention, the deformable holding means may be a wire or the like. The wire may have a round, square, tubular, or similar cross-section.

In order that the invention will be more clearly understood, it will now be disclosed in greater detail with reference to the accompanying drawings, wherein.

Figure 1:
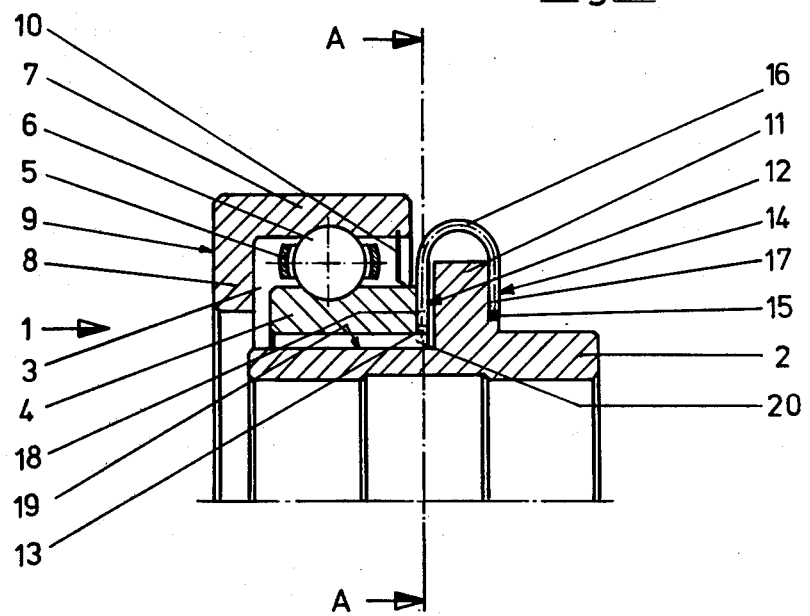
FIG. 1 is a longitudinal cross-sectional view of a bearing assembly in accordance with one embodiment of the invention, the view showing the bearing only to one side of the axis thereof.

Referring now to the drawings, and more in particular to FIG. 1, a self-centering clutch bearing assembly 1, in accordance with one embodiment of the invention, comprises a roller bearing 3 having an inner ring 4 and an outer ring 7 define a race therebetween for balls 6. The balls are held in the races by means of a cage 5. The outer ring 7 has a radially inwardly directed ring flange 8 at one side thereof, this ring flange 8 having an axial face 9 adapted to engage a clutch lever (not shown) of a clutch assembly. A sealing disk 10 is fitted in the bore of the outer ring 7, the inner end of the disk 10 slidably engaging the shoulder of the inner ring 4. The bearing 3 is arranged on a slidiing sleeve 2 of the clutch bearing assembly, in a manner to be described in greater detail in the following paragraph.

As illustrated in FIG. 1, the inner ring 4, in the illustrated example, is a stationary ring. One end of the sliding sleeve 2 extends into the inner ring 4, the outer surface 19 of the sleeve 2 at this point being radially spaced from the inner side of the inner ring 4, to provide a radial play space 20. The sliding sleeve 2 is provided with an outwardly directed ring flange 11 on the side of the bearing assembly away from the inwardly directed ring flange 8 of the outer ring. The ring flange 11 of the sleeve 2 is spaced from the adjacent end face 12 of the inner ring 4. A plurality of radially extending recesses or grooves 13 are provided in the face 12 of the inner ring, and a plurality of similar recessed grooves 15 are provided in the face 14 of the outwardly directed flange 11 of the sliding sleeve 2. The grooves 13 are axially aligned with the grooves 15.

In this arrangement in accordance with the invention, the deformable holding means comprises a plurality of deformable wire bights or clips 16. One end of each bight or clip is held in a groove 13 of the inner ring, and the other end of each bight or clip is held in the axially aligned groove 15. The clips 16, which may be formed of permanently deformable round wire, are thus positively held in the inner ring and in the slidable sleeve 2.

In the assembly of the arrangement of FIG. 1, the ends of the bights or clips 16 may be simultaneously axially pressed into the recesses 13 and 15. These recesses are, of course, formed to hold the wire bights or clips, and may, for example, constitute radially drilled holes at the end of the respective members.

Figure 2:
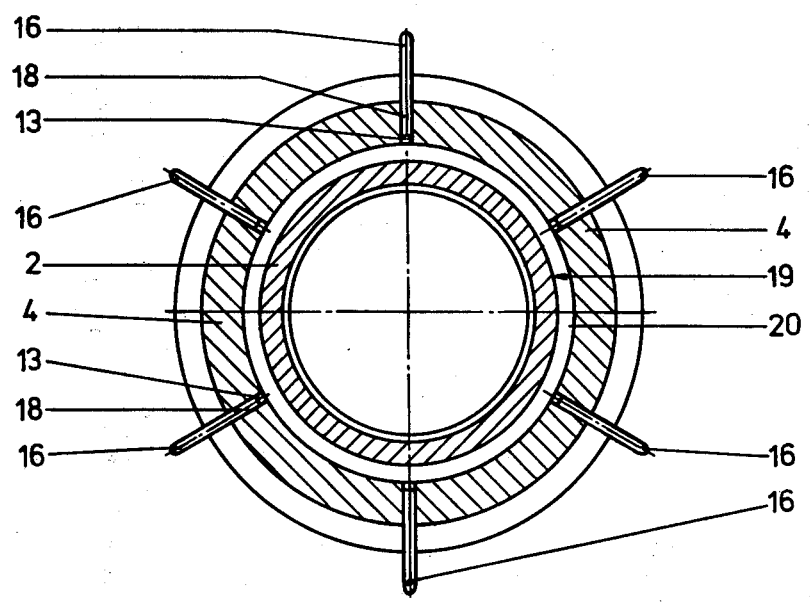
FIG. 2 is a cross-sectional view of the bearing assembly of FIG. 1, taken along the lines A—A, this view additionally illustrating the identical nature of the bearing at the other side of the axis.

As is apparent in FIG. 2, the permanently deformable holding means, in the form of bights or clips 16, are arranged between the stationary inner ring 4 and the sliding sleeve 2. The bights or clips 16 are uniformly arranged at the periphery of these members, and a suitable number are provided to prevent relative angular displacement of the sleeve 2 and the inner ring 4, while enabling radial movement thereof due to deformation of the clips. While six bights or clips 16 are illustrated in FIG. 2, it will be apparent that the invention is not limited to this number, and either a greater or lesser number may be employed.

Since the radial play space 20 is provided between the inner ring 4 and sliding sleeve 2, it is apparent that the clips 16 may be deformed, in the event of offset between the centers of the axles of the clutch, in order to enable self-adjustment in the radial direction opposite the clutch.

During the assembly of a clutch bearing in a clutch assembly, the clutch bearing generally does not lie exactly co-axially with respect to the clutch disengaging device. In this case, employing the clutch bearing of FIGS. 1 and 2, upon the first disengaging operation of the bearing may move radially with respect to the axle, opposite the sliding sleeve 2, until the actuating element becomes self-centered with respect to the clutch disengaging device. As a result, the deformable bights or clips are adjusted in such a manner that their effect does not exceed the centering strain, but will be larger than any inertia, impact and/or percussive forces. Consequently, the self-centering of the assembly is maintained, and has a lasting effect. The arrangement in accordance with the invention thereby provides an excellent disengaging function, with a reduction in wear and tear, and substantially complete elimination of noise. In addition, in the event of heavy impact of the races, the races of the roller bearing rings 4 and 7 of the bearing are protected against damage, and at the same time an easily effected self-centering is assured and the inner ring 4 of the roller bearing is effectively protected against twisting in the direction of rotation without restricting radial adjusting movements of the roller bearing 3.

Figure 3:
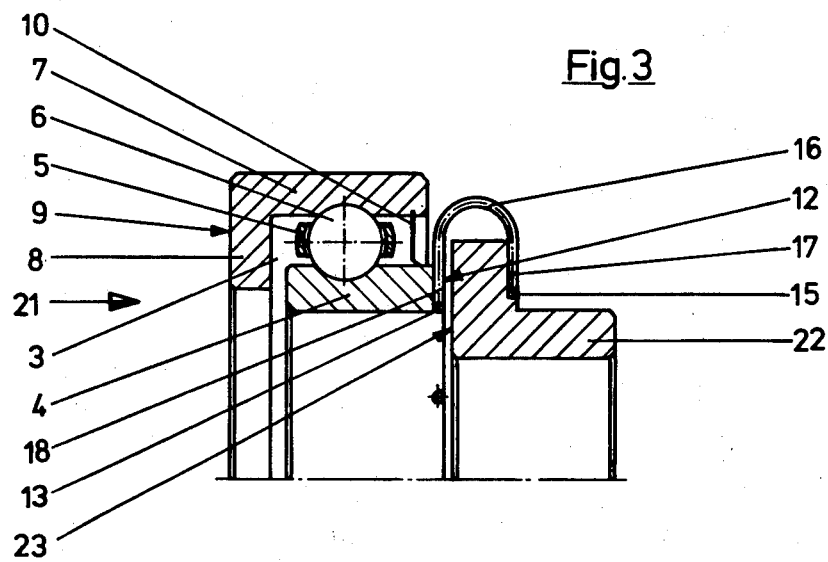
FIG. 3 is a longitudinal cross-sectional view of a bearing assembly in accordance with a further embodiment of the invention, this view also showing the bearing only at one side of the axis.

In the modification of the invention illustrated in FIG. 3, the elements are arranged in the same manner as in FIG. 1, with the exception that the sliding sleeve 22 does not extend into the inner ring, but has a simple angular cross-section. In this arrangement, the face 23 of the sleeve 22 toward the inner ring 4 serves as a locating surface for the face 12 of the inner ring. The roller bearing 3 is held in its assumed position by the deformable clips 16, and shifts, if any, that may occur due to further operation of the clutch, are automatically corrected by the deformable holding means.

Figure 4:
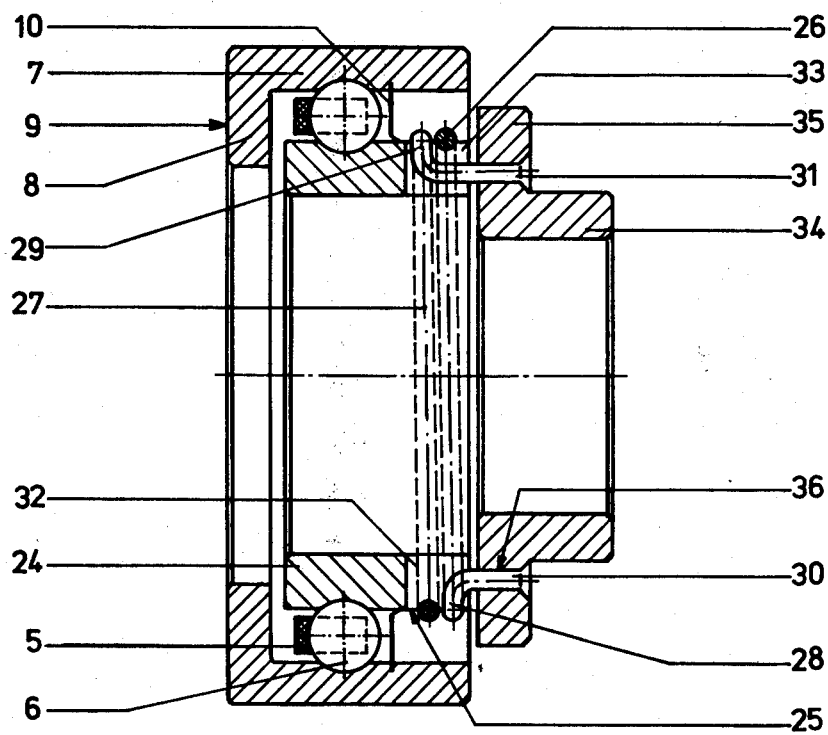
FIG. 4 is a longitudinal cross-sectional view of a bearing assembly in accordance with a still further embodiment of the invention.

In the embodiment of the invention illustrated in FIG. 4, the stationary roller bearing ring, in this case the inner ring 24, is coupled to the sliding sleeve 34 by means of a deformable holding means in the form of a coil 26. In this case, the inner ring 24 has spirally running grooves 27 in an outer shoulder surface 25 toward the sleeve 34. The the grooves 27. At the ends of the wound portion of the coil, the coil 26 is bent radially inwardly, as illustrated at 28,29, to extend into diametrically opposite radically extending slits 32 and 33, respectively, of the inner ring. The ends 30 and 31, respectively, of the coil are than bent in the slits 32 and 33 to extend in an axial direction toward the sliding sleeve 34.

The sliding sleeve 34 has an angular cross-section with a radially outwardly extending flange 35 on the side thereof toward the inner ring 24. Diametrically opposite apertures or holes 36 are provided in the flange 35, and the ends 30 and 31 extend into these holes 36 and are affixed therein. Thus, since the end portions of the coil extend through the radially extending slits of the inner rings, the inner ring is held against twisting with respect to the sliding sleeve. The coil 26, however, enables radial displacement of the inner ring with respect to the sliding sleeve 34.

While the invention has been disclosed and described with reference to a limited number of embodiments, it will be apparent that variations and modifications may be made therein, and it is intended in the following claims to cover each such variation and modification as falls within the true spirit and scope of the invention.

What is claimed is:

1. In a clutch bearing assembly having a bearing with first and second rings defining races for rolling bearing elements, a sliding sleeve, and means coupling said sliding sleeve to said second ring, the improvement wherein said coupling means comprises permanently deformable holding means intercoupling said second ring and sliding sleeve for permitting displacement of said second ring with respect to said sleeve in all radial directions while inhibiting relative rotation therebetween, said deformable holding means being positively connected to at least one of said second ring and sliding sleeve.

2. The clutch bearing assembly of claim 1 wherein said deformable holding means comprises deformable bight means extending from the periphery of said bearing and sliding sleeve and positively affixed to said second ring and to said sliding sleeve.

3. The clutch bearing assembly of claim 2 further comprising a plurality of radially extending grooves in the face of said second ring toward said sliding sleeve, and a plurality of radially extending grooves in the face of said sliding sleeve away from said second ring, the grooves of said second ring and sliding sleeve being axially aligned, and wherein said bight means comprises deformable U-shaped members having opposite ends fixedly held in respective axially aligned grooves in said second ring and said sliding sleeve.

4. The clutch bearing assembly of claim 1 wherein said deformable holding means comprises a coil having its ends affixed to one of said sliding sleeve and second ring and the central portion thereof wound around the other of said sliding sleeve and second ring.

5. The clutch bearing assembly of claim 4 wherein said second ring has a shoulder with spiral grooves, and diametrically opposed radially extending slits in said shoulder, said coil engaging said spiral grooves and extending radially inwardly into said slits, and thence axially toward said sliding sleeve, the ends of said coil being affixed in said sliding sleeve.

6. The clutch bearing assembly of claim 1 wherein said first ring is an outer bearing ring, and said second ring is an inner bearing ring of said bearing.

7. The clutch bearing assembly of claim 1 wherein said deformable holding means comprises wire of arbitrary cross-section.

* * * * *

UNITED STATES PATENT AND TRADEMARK OFFICE
CERTIFICATE OF CORRECTION

PATENT NO. : 4,059,179
DATED : November 22, 1977
INVENTOR(S) : Horst Manfred Ernst, et al It is certified that error appears in the above-identified patent and that said Letters Patent are hereby corrected as shown below:

Column 2, line 30 change "define" to --defining--.

Column 3, line 63 change "The the grooves 27." to -- The coil 26 engages the grooves 27."

Signed and Sealed this

Fourth Day of April 1978

[SEAL]

Attest:

RUTH C. MASON
Attesting Officer

LUTRELLE F. PARKER
Acting Commissioner of Patents and Trademarks